United States Patent [19]

Uchiyama et al.

[11] Patent Number: 5,406,546
[45] Date of Patent: Apr. 11, 1995

[54] MAGNETO-OPTICAL DISK

[75] Inventors: Kenji Uchiyama; Hirokazu Fujioka; Masanori Shibahara, all of Nagano, Japan

[73] Assignee: TDK Corporation, Tokyo, Japan

[21] Appl. No.: 130,788

[22] Filed: Oct. 4, 1993

[30] Foreign Application Priority Data

Oct. 5, 1992 [JP] Japan ................. 4-290797

[51] Int. Cl.⁶ .............................. G11B 3/72
[52] U.S. Cl. ..................... 369/275.4; 369/277
[58] Field of Search ............... 369/275.4, 277, 278, 369/272, 283, 13

[56] References Cited

U.S. PATENT DOCUMENTS

| | | | |
|---|---|---|---|
| 4,931,336 | 1/1989 | Haneda | 428/64 |
| 5,075,147 | 12/1991 | Usami et al. | 369/272 |
| 5,191,565 | 3/1993 | Inoue et al. | 369/283 |
| 5,202,881 | 4/1983 | Suzuki | 369/283 |
| 5,216,665 | 1/1993 | Imataki | 369/275.4 |
| 5,279,877 | 1/1994 | Uchiyama et al. | 369/283 |

FOREIGN PATENT DOCUMENTS

| | | | |
|---|---|---|---|
| 2-78038 | 3/1990 | Japan | . |
| 4-358331 | 6/1991 | Japan | . |
| 4-358331 | 12/1992 | Japan | 369/275.4 |

Primary Examiner—Eugene R. LaRoche
Assistant Examiner—Tan Nguyen
Attorney, Agent, or Firm—Watson, Cole, Grindle & Watson

[57] ABSTRACT

In a magneto-optical disk comprising a disk-shaped substrate including a grooved region in its surface and a recording layer covering the grooved region, the groove is defined by a pair of opposed side walls and a bottom in a radial cross section of the substrate and has a depth from the substrate surface to the groove bottom. The angle $\theta$ included between tangents to the side walls is at least 120 degrees, and the groove has a half-value width of 0.90 to 1.15 $\mu$m and a depth of 600 to 900 Å. The disk produces satisfactory values of push-pull signal level, radial contrast, and C/N ratio.

7 Claims, 2 Drawing Sheets

MAGNETO-OPTICAL DISK

BACKGROUND OF THE INVENTION

1. Field of the Invention

This invention relates to a magneto-optical disk having a grooved substrate.

2. Prior Art

Most magneto-optical disks are of the structure having a magneto-optical recording layer on a grooved substrate. Signals are recorded in and reproduced from the recording layer within the groove. During recording and reproducing operation, tracking control and track counting for search are carried out by detecting the intensity of reflected light from near the groove.

Parameters associated with the control include a push-pull signal level and radial contrast during tracking in the grooved region.

The push-pull signals are tracking signals obtained in tracking control by a push-pull method. The push-pull method uses a two-divided photodetector consisting of two light-receiving sections each in the form of a photo diode disposed symmetrically with respect to the track center. The two light-receiving sections receive the light reflected and diffracted by a groove or pit on the disk, and a tracking error is detected from a differential output of the photo diodes. The push-pull signal level P-P is represented by $$P-P = (I_1 - I_2)/(I_1 + I_2)$$

wherein $I_1$ and $I_2$ are outputs of the two light-receiving sections. Too low push-pull signal levels can cause a failure of normal tracking whereas too high push-pull signal levels become unbalanced with other optical properties and would introduce noise in focus servo signals depending on the type of optical head.

The radial contrast RC in the grooved region is represented by $$RC = 2|I_L - I_G|/(I_L + I_G)$$

wherein $I_L$ and $I_G$ are outputs of a signal from the land and the groove, respectively, when a low-pass filter is used. From RC outputs, the number of tracks that the optical head has jumped over and the moving direction or polarity of the optical head are known. Too low radial contrast values can introduce errors in track counting and polarity judgment whereas too high radial contrast values would render the servo system unstable due to disturbance noise.

Both the push-pull signal level and radial contrast vary with the width and depth of the groove and C/N also varies therewith. More particularly, the radial contrast increases as the groove depth increases (in the case of a groove depth $\leq \lambda/4n$ wherein $\lambda$ is a light wavelength and n is a refractive index) and as the groove width increases. The push-pull signal level decreases as the groove depth decreases (in the case of a groove depth $\leq \lambda/8n$) and as the groove width increases (in the case of a groove pitch of 1.6 $\mu$m and a groove width $\leq 0.8$ $\mu$m). The C/N ratio increases as the groove width increases. It is then difficult to have a satisfactory push-pull signal level and radial contrast value as well as an acceptable C/N ratio.

SUMMARY OF THE INVENTION

Therefore, an object of the present invention is to provide a new and improved magneto-optical disk having satisfactory values of push-pull signal level, radial contrast, and C/N ratio.

According to the present invention, there is provided a magneto-optical disk comprising a disk-shaped substrate having a surface including a region where a groove is formed. A recording layer in the form of a magnetic thin film covers the grooved region. Signals are recorded in and reproduced from the recording layer within the groove by means of an optical head. The groove is defined by a pair of opposed side walls and a bottom in a radial cross section of the substrate and has a depth D from the substrate surface to the groove bottom. Tangents are drawn to the side walls at a height (M=D/2) from the groove bottom corresponding to 50% of the groove depth. The essential feature of the invention is that the angle $\theta$ included between the tangents is at least 120 degrees, especially 120 to 165 degrees, the groove has a half-value width (M—M) of 0.90 to 1.15 $\mu$m as measured between the contacts of the tangents and the side walls and a depth D of 600 to 900 Å.

The groove having a half-value width is separated from the adjacent groove by a land having a width in a radial direction. Preferably the groove half-value width is equal to or greater than the land width.

Preferably the optical head has an objective lens with a numerical aperture NA of 0.40 to 0.50. Recording is done using linearly polarized laser light of 600 to 900 nm in wavelength having an electric field vector in a radial direction of the substrate.

Preferably the reflectance of the disk through the substrate at the wavelength of recording and reproducing light is 15 to 25% in both recorded and unrecorded portions.

Often the disk further includes a first protective layer on the side of the recording layer adjacent to the substrate and a second protective layer on the side of the recording layer remote from the substrate, and a reflective layer on the second protective layer.

Making a series of experiments on grooves of various cross-sectional shapes, we have found that the push-pull signal level, radial contrast, and C/N ratio depends on not only the width and depth of the groove, but also the cross-sectional shape thereof. These properties are significantly improved when the angle $\theta$ included between the tangents to the groove side walls is at least 120 degrees.

Japanese Patent Application Kokai (JP-A) No. 078038/1990 discloses an optical recording medium having a recording layer of In:GeS:Au or the like. JP-A 358331/1992 discloses an optical recording medium having a recording layer in the form of a dye film and a reflective layer. These media are recordable in the CD format. In some of the examples given in these publications, the groove has an included angle $\theta$ of more than 120°. Recording and reproducing operation in the CD format requires a reflectance of about 70% in unrecorded portions and about 15% in recorded portions.

In contrast, the magneto-optical recording medium must have a reflectance of 15 to 25% in both recorded and unrecorded portions. Therefore, for tracking control on the basis of differential reflectance by the push-pull method, the optimum configuration and size of the groove differ between the CD format optical recording medium and the magneto-optical recording medium. Since the thickness of a dye base recording layer is different between the groove and the land, the configuration and size of the groove for providing optimum radial contrast are significantly different from those of magneto-optical recording media. As a result, the width and depth of the groove in the present invention differ from those of the above-mentioned publications although there is an overlap in included angle $\theta$ between the present invention and the above-mentioned publications.

BRIEF DESCRIPTION OF THE DRAWINGS

These and other objects, features and advantages of the invention will be more fully understood from the following description taken in conjunction with the accompanying drawings.

DETAILED DESCRIPTION OF THE INVENTION

The magneto-optical disk of the invention includes a disk-shaped substrate having a pair of opposed major surfaces. One substrate surface includes an annular region where a groove is formed, which is often referred to as a grooved region. A recording layer covers the grooved region. In the case of a pre-formatted disk, the surface further includes a region where a row of pits are formed. The pitted region is disposed at the lead-in or lead-out area of the grooved region. In the pitted region, bits of information helping the hardware operate the disk under optimum conditions and discrete bits of information such as pulse signals of a predetermined cycle are previously recorded as pits. The groove and pit row may be provided in either a spiral form or a concentric form.

The grooved region consists of a plurality of groove turns (of a spiral groove or concentric grooves) and land turns between the adjacent groove turns. The groove is provided for tracking by recording and reproducing light while the groove can be wobbled for controlling the number of revolutions of the disk or for carrying time information or address information. Signals are recorded in and reproduced from the recording layer within the groove.

Figure 1:
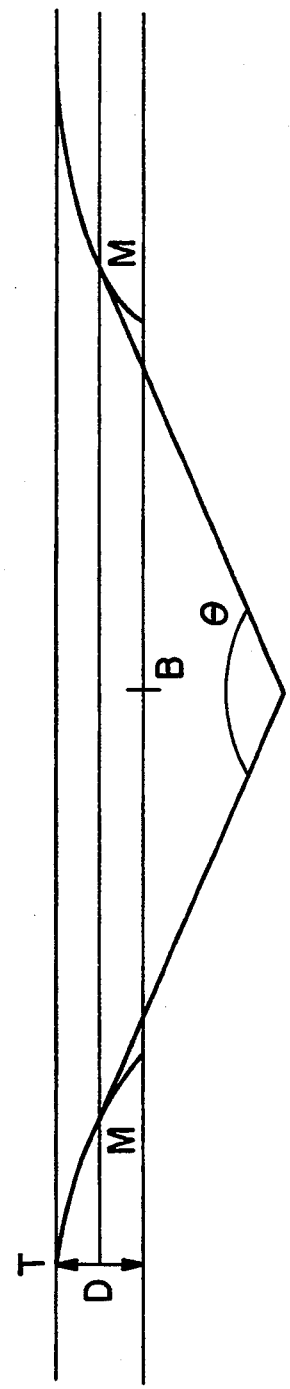
FIG. 1 is a schematic cross-sectional view of a groove for illustrating the angle $\theta$ included between tangents to the groove side walls.

Referring to FIG. 1, a groove in the substrate is schematically illustrated in a radial cross section of the substrate. The groove is generally of widened U shape. The groove is defined by a pair of opposed side walls and a bottom B and has a depth D from the substrate surface T to the groove bottom B. The side walls are inclined from the top T to the bottom B and toward each other, and the bottom is generally flat. Tangents are drawn to the side walls at a height M from the groove bottom corresponding to 50% of the groove depth D (that is, M=D/2). The essential feature of the invention is that the angle $\theta$ included between the side wall tangents is at least 120°, preferably at least 125°. If the included angle $\theta$ is less than 120°, it is difficult to satisfy all of push-pull signal level, radial contrast, and C/N at the same time. Preferably the included angle $\theta$ is up to 165°, especially up to 160°. Beyond this upper limit, there is the tendency that tracking control and track counting during search become difficult. It is to be noted that the angle included between each of the tangents to the groove side walls and the groove bottom is at least 90°. That is, the land between the adjacent grooves does not hang over the groove or groove bottom.

Note that the groove depth D is a distance between the substrate or land surface and the groove bottom as measured in a direction perpendicular to the substrate major surface. Where the groove bottom and land surface are not flat, the groove depth D is a perpendicular distance between the lowest position of the groove bottom B and the highest position of the land surface T as schematically shown in FIG. 1.

An included angle $\theta$ within the above-specified range can be accomplished by any desired means, for example, by taking appropriate steps in fabricating a stamper which is used for the preparation of substrates, namely by selecting a resist having an appropriate degree of resolution in a mastering stage and selecting appropriate light exposure conditions.

Figure 2:
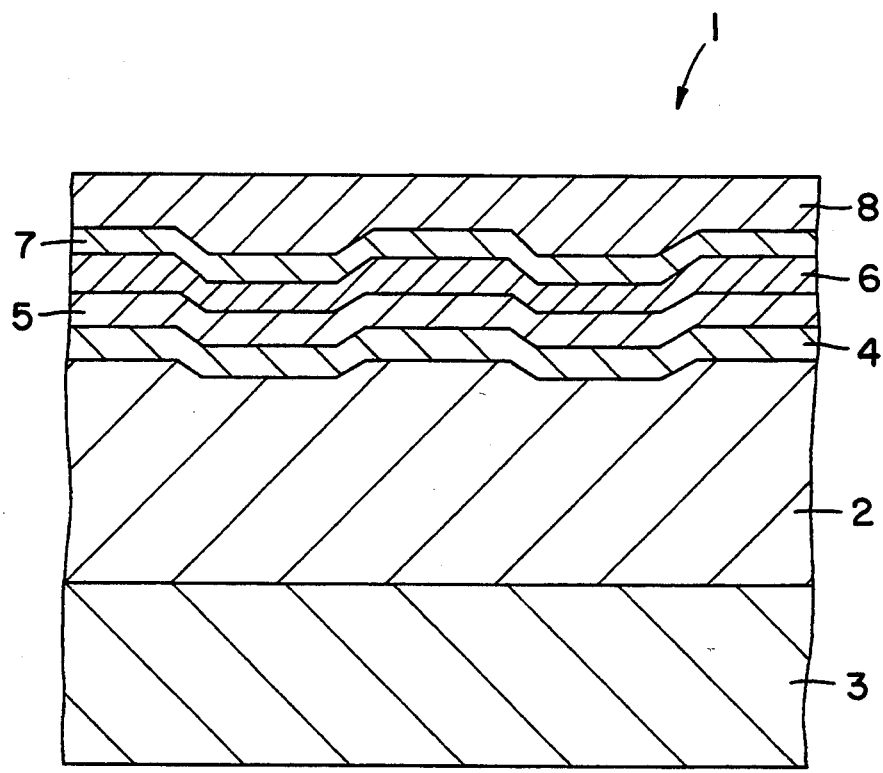
FIG. 2 is a fragmental cross-sectional view of a magneto-optical disk according to one embodiment of the invention.

The groove width and the land width both in a substrate radial direction (as seen in FIGS. 1 and 2) are not particularly limited. More of the benefits are obtained when the land width is reduced, especially when the groove (half-value) width divided by the land width is 1 or higher. The groove width may be suitably determined by considering the diameter of a light beam spot, track pitch and the like. The invention becomes more effective when the track pitch is about 1.2 to 1.6 $\mu$m, the groove half-value width is about 0.90 to 1.15 $\mu$m, especially about 0.95 to 1.15 $\mu$m, and an optical system as will be described later is used. It is to be noted that groove half-value width is a groove width at a position of 50% of the groove depth D, that is, distance M—M in FIG. 1.

Also the groove depth is not particularly limited and may be suitably determined in accordance with the groove width while considering various properties during tracking and search. When the groove width is about 0.95 to 1.15 $\mu$m and an optical system as will be described later is used, better results are obtained by limiting the groove depth to about 600 to 900 Å.

Where a row of pits are formed, the dimensions of pits may be suitably determined in accordance with the dimensions of the groove in order to obtain satisfactory properties in the pitted region because the same light beam is irradiated to the pits and the groove. For the groove of the above-specified dimensions, the pits preferably have a width of about 0.40 to 0.50 $\mu$m and a depth of about 650 to 900 Å (the pit width and depth are similarly defined as are the groove width and depth).

The cross-sectional shape and dimensions of the groove and pits can be measured by means of a scanning tunnel microscope (STM) or scanning electron microscope (SEM). Preferably the depth of the groove and pit is measured by STM and their width by SEM. The groove half-value width used herein is the distance between the intermediate points M on the opposed side walls in the depth direction as seen in the groove cross section (SEM photograph) of FIG. 1. The groove depth is determined from a STM photograph by the method defined previously. The land width is the track pitch minus the groove width. The dimensions of pits may be determined in the same manner as the groove. A SEM photograph is used for the calculation of $\theta$. It is to be noted that each of the groove and pit dimensions is an average of five or more measurements.

In the practice of the invention, signals are preferably recorded in and reproduced from the recording layer within the groove by a drive means equipped with an optical head having an objective lens with a numerical aperture NA of 0.40 to 0.50, preferably 0.44 to 0.46. The recording and reproducing light preferably has a wavelength of 600 to 900 nm, more preferably 770 to 790 nm. Additionally the recording and reproducing light should be linearly polarized and have an electric field vector in a radial direction of the substrate or perpendicular to the longitudinal direction of the groove.

Using such an optical system, all the push-pull signal level, radial contrast, and C/N are significantly improved. It is preferred in the grooved region that the push-pull signal level is from 0.11 to 0.20, the radial contrast is from 0.20 to 0.35, and the C/N is at least 46 dB. It is possible to obtain these parameters within the preferred ranges simply by limiting the included angle $\theta$ associated with the groove cross-sectional shape and using the above-specified optical system. It is to be understood that the C/N value is that obtained when a signal is recorded with an optimum power under a magnetic field of relatively low intensity (of about 50 to 150 Oe) at the recording layer surface.

Except for the groove configuration and dimensions, no particular limit is imposed on the components of the magneto-optical disk according to the present invention. These remaining components may be suitably selected from conventional ones. One preferred exemplary disk arrangement is described below though the invention is not limited thereto.

Referring to FIG. 2, there is illustrated in radial cross section a fragment of a magneto-optical disk according to one embodiment of the invention. The disk 1 includes a substrate 2 and has a protective layer 4, a recording layer 5, another protective layer 6, a reflective layer 7, and a protective coating 8 on one surface of the substrate 2 in the described order in close contact arrangement. During operation, the magnetic head (not shown) is in sliding contact with the disk surface at the protective coating 8. Alternative arrangements are that the magnetic head is kept afloat above the disk surface due to a lift during rotation of the disk and that the magnetic head is held at a predetermined spacing from the disk surface.

Since the magneto-optical disk of the invention is recorded and read by using an optical head positioned on the rear surface side of the substrate 2 (the lower side in FIG. 2) and directing a laser beam through the substrate, the substrate is formed of glass or transparent resins such as polycarbonate, acrylic resins, amorphous polyolefins, and styrene resins.

The protective layers 4 and 6 are effective for improving C/N and preventing corrosion of the recording layer and their thickness is generally about 10 to 150 nm. It is desired to provide at least one of these protective layers, most desirably both. The protective layers are formed of a dielectric material such as oxides, carbides, nitrides, sulfides and mixtures thereof (e.g., LaSiON) by any desired gas phase deposition method such as sputtering, evaporation and ion plating.

In the recording layer 5, information can be magnetically recorded using a modulated thermal beam or modulated magnetic field and the recorded information be read through magneto-optical conversion. The recording layer 5 may be of any desired material as long as it is a magnetic film capable of magneto-optical recording. Preferably an alloy containing a rare earth metal, especially a rare earth metal and a transition metal is deposited by sputtering, evaporation or ion plating, preferably by sputtering to form an amorphous film. Some preferred compositions are TbFeCo, DyTbFeCo, NdDyFeCo, and NdGdFeCo. The recording layer 5 is generally about 10 to 100 nm thick.

The reflective layer 7 is optionally disposed and formed of any of relatively high reflectivity metal materials which include Au, Ag, Pt, Al, Ti, Cr, Ni and Co and alloys or compounds thereof. The reflective layer 7 may be formed in a similar manner to the recording layer 5. The reflective layer 7 is generally about 30 to 200 nm thick.

The protective coating 8 is a resinous film provided for protecting the underlying sputtered layers up to the reflective layer 7.

Preferably the resin of which the protective coating 8 is formed is a radiation curable resin. More particularly, the coating is made of a material obtained by radiation curing a radiation curable compound or a polymerizable composition thereof. Illustrative are monomers, oligomers and polymers having contained or incorporated in their molecule groups capable of crosslinking or polymerizing upon exposure to radiation, for example, acrylic double bonds as given by acrylic and methacrylic acids and esters thereof having an unsaturated double bond sensitive to ionization energy and capable of radical polymerization, allyl double bonds as given by diallyl phthalate, and unsaturated bonds as given by maleic acid and maleic derivatives. They are preferably polyfunctional, especially trifunctional or more and used alone or in admixture of two or more.

The radiation curable monomers and oligomers used herein preferably have a molecular weight of less than 2,000 and 2,000 to 10,000, respectively. Examples include styrene, ethyl acrylate, ethylene glycol diacrylate, ethylene glycol dimethacrylate, diethylene glycol diacrylate, diethylene glycol methacrylate, 1,6-hexane glycol diacrylate, and 1,6-hexane glycol dimethacrylate while preferred examples include pentaerythritol tetraacrylate (or methacrylate), pentaerythritol acrylate (or methacrylate), trimethylolpropane triacrylate (or methacrylate), trimethylolpropane diacrylate (or methacrylate), acryl-modified urethane elastomers, and derivatives of these having a functional group such as COOH incorporated therein, phenol ethylene oxide adduct acrylate (or methacrylate), compounds having an acryl or methacryl group or $\epsilon$-caprolactone acryl group attached to a pentaerythritol fused ring as disclosed in Japanese Patent Application No. 072888/1987, and acryl group-containing monomers and oligomers such as special acrylates as disclosed in Japanese Patent Application No. 072888/1987. Other useful radiation curable oligomers are acryl-modified ones of oligoester acrylate and urethane elastomers and derivatives of these having a functional group such as COOH incorporated therein.

In addition to or instead of the above-mentioned compound, there may be used radiation curable compounds obtained by modifying thermoplastic resin to be radiation sensitive. Exemplary radiation curable resins are thermoplastic resins containing or having incorporated in a molecule thereof a group capable of crosslinking or polymerizing upon exposure to radiation, for example, a acrylic double bond as given by acrylic acid, methacrylic acid and esters thereof having an unsaturated double bond capable of radical polymerization, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyester resins, polyether ester resins, polyvinyl pyrrolidone resin and derivatives (PVP-olefin copolymers), polyamide resins, polyimide resins, phenolic resins, spiro-acetal resins, and acrylic resins containing at least an acrylate and methacrylate having a hydroxyl group as a polymerizable component.

A polymerizable coating composition is cured with radiation, typically ultraviolet radiation and a photo-polymerization initiator or sensitizer is preferably contained in the composition. The photo-polymerization initiator or sensitizer used herein is not critical and may be selected from conventional ones such as acetophenones, benzoins, benzophenones, and thioxanthoins. A mixture of initiators and/or sensitizers is also useful. The composition may contain about 0.5 to 5% by weight of the initiator. The polymerizable composition may be synthesized by a conventional method or prepared by mixing commercially available compounds.

Another composition containing a radiation curable compound from which the protective coating 8 can be formed is one containing an epoxy resin and a cationic photo-polymerization catalyst.

Epoxy resins are preferably alicyclic epoxy resins, especially those having two or more epoxy groups in a molecule. Exemplary alicyclic epoxy resins are 3,4-epoxycyclohexylmethyl-3,4-epoxycyclohexane carboxylate, bis(3,4-epoxycyclohexylmethyl)adipate, bis(3,4-epoxycyclohexyl)adipate, 2-(3,4-epoxycyclohexyl-5,5-spiro-3,4-epoxy)cyclohexane-metadioxane, bis(2,3-epoxycyclopentyl) ether, vinylcyclohexene dioxide alone or in admixture. The alicyclic epoxy resins may have any desired epoxy equivalent although an epoxy equivalent of 60 to 300, especially 100 to 200 is preferred for satisfactory curability.

The cationic photo-polymerization catalyst may be selected from well-known ones. Examples include complexes of metal fluoroborate and boron trifluoride, bis(-perfluoroalkylsulfonyl)methane metal salts, aryl diazonium compounds, aromatic onium salts of Group 6A elements, aromatic onium salts of Group 5A elements, dicarbonyl chelates of Group 3A to 5A elements, thiopyrilium salts, Group 6A elements having $MF_6$ anions wherein M is P, As or Sb, triaryl sulfonium complex salts, aromatic iodonium complex salts, and aromatic sulfonium complex salts. Preferred are polyaryl sulfonium complex salts, aromatic sulfonium or iodonium salts of halo-containing complex ions, and aromatic onium salts of Group 3A, 5A or 6A elements.

Also useful are cationic photo-polymerization catalysts containing an organometallic compound and a photo-decomposable organic silicon compound. These cationic photo-polymerization catalysts are non-strong acid systems and thus avoid any adverse effect to the corrosion-susceptible recording layer of the magneto-optical recording disk. The organometallic compounds are preferably complex compounds in which alkoxy, phenoxy, β-diketonato and similar groups are coordinated to a metal atom such as Ti, V, Cr, Mn, Fe, Co, Ni, Cu, Zn, Al, and Zr. Especially preferred are organic aluminum compounds such as trismethoxy aluminum, trispropionato aluminum, tristrifluoroacetyl aluminum, and trisethylacetoacetonato aluminum.

The photo-decomposable organic silicon compounds are to form silanols upon exposure to radiation such as ultraviolet radiation. Silicon compounds having a peroxysilano, o-nitrobenzyl and α-ketosilyl group are preferred.

Preferably the composition contains 0.05 to 0.7 parts, especially 0.1 to 0.5 parts by weight of the cationic photo-polymerization catalyst per 100 parts by weight of the epoxy resin.

Preferred among the aforementioned compositions is a composition containing a radiation curable compound having an acryl group and a photo-polymerization initiator or sensitizer, which is applied to form a coating and then cured with radiation, especially UV radiation.

The protective coating 8 is preferably 1 to 30 μm, especially 2 to 20 μm thick. Too thin coatings would be difficult to form as a uniform film and a durability problem would arise. Too thick coatings tend to crack due to shrinkage upon curing or cause warpage of the disk.

The protective coating 8 is prepared by first applying a resin, preferably a radiation curable resin composition as mentioned above to form a coating. The coating method is not critical and may be selected from well-known ones such as spin coating, screen printing, gravure coating, spray coating and dipping. Coating conditions may be properly determined by taking into account the viscosity of polymerizable composition, the desired buildup of coating and the like. Then the coating is exposed to UV radiation for curing. If desired, the coating is heated prior to UV exposure, and electron radiation or the like may be used instead of UV. Typically, the coating is exposed to UV radiation at an intensity of about 50 mW/cm$^2$ or more and a dose of about 500 to 2,000 mJ/cm$^2$. The UV source may be a conventional one such as a mercury lamp. Upon UV exposure, the compounds undergo radical polymerization.

On the rear surface of the substrate 2 is formed a transparent hard coating 3 as shown in FIG. 2, if desired. The composition and thickness of the hard coating are the same as the protective coating 8. Preferably the hard coating 3 is rendered antistatic by adding a surfactant or the like. The hard coating may be disposed not only on the rear surface of the substrate, but also on the inner and outer peripheral edges of the disk.

Preferably the reflectance of the disk through the substrate at the wavelength of recording and reproducing light is 15 to 25%, more preferably 15 to 20% in both recorded and unrecorded portions.

EXAMPLE

Examples of the present invention are given below by way of illustration.

Magneto-optical disk samples were prepared.

First, a disk-shaped substrate having an outer diameter of 64 mm, an inner diameter of 11 mm and a recording area thickness of 1.2 mm was injection molded from a polycarbonate resin. At the same time as injection molding, a spiral groove was formed on one major surface of the substrate.

A protective layer of SiNx was deposited on the grooved surface by RF magnetron sputtering to a thickness of 90 nm. A recording layer of the composition: $Tb_{23}Fe_{72}Co_5$ (atomic ratio) was then deposited on the protective layer to cover the grooved region by magnetron sputtering to a thickness of 20 nm. Then a protective coating of LaSiON was formed on the recording layer by RF magnetron sputtering to a thickness of 20 nm. On the protective coating, an Al alloy reflective layer of 80 nm thick and a protective coating were sequentially formed.

The protective coating was formed by spin coating a polymerizable composition consisting essentially of 50 parts by weight of an oligoester acrylate (molecular weight 5,000), 50 parts by weight of trimethylolpropane triacrylate, and 3 parts by weight of acetophenone photopolymerization initiator, and exposing the coating to UV radiation for curing. At the end of curing, it had an average thickness of about 5 $\mu$m. The UV dose was 1,000 mJ/cm$^2$.

Additional samples were prepared by the same procedure as above except that different stampers were used for the molding of substrates. These stampers were prepared by using a resist having a different degree of resolution in the mastering stage and exposing it to light under different conditions.

The resulting magneto-optical disk samples were examined by immersing them in liquefied nitrogen, cutting them in a disk radial direction, and observing the groove cross-sectional shape appearing in the substrate section under SEM. The included angle $\theta$, groove width M—M and groove depth D were measured as defined previously. The measurements are reported in Table 1. The track pitch was 1.6 $\mu$m. The reflectance was about 20%.

The disk samples were measured for push-pull signal level (P-P), radial contrast (RC) and C/N ratio. Used in the measurement was a drive means equipped with an optical head having an objective lens with a numerical aperture NA of 0.45. Linearly polarized laser light having a wavelength of 780 nm was directed to the disk so that its electric field vector was in a radial direction of the disk. The C/N was that of a 3T signal of EFM recorded under conditions: a recording power of 4.55 mW, a lead power of 0.60 mW, a magnetic field intensity of 100 Oe at the recording layer surface, and a linear velocity of 1.4 m/s.

The results are shown in Table 1.

TABLE 1

| Sample No. | $\theta$ (°) | Groove Width ($\mu$m) | Depth (Å) | P-P | RC | C/N (dB) |
|---|---|---|---|---|---|---|
| 1 (C) | 110* | 1.04 | 640 | 0.14 | 0.33 | 45.8** |
| 2 (C) | 101* | 1.12 | 600 | 0.12 | 0.38** | 47.1 |
| 3 (C) | 115* | 1.13 | 510 | 0.09** | 0.31 | 46.8 |
| 4 | 129 | 1.12 | 630 | 0.13 | 0.33 | 46.7 |
| 5 | 127 | 1.04 | 610 | 0.12 | 0.26 | 46.3 |

C: comparison
*outside the scope of the invention
**outside the preferred range of the invention The benefits of the invention are evident from the data of Table 1. Sample No. 1 was low in C/N. Sample No. 2 that attempted to improve the C/N of sample No. 1 by increasing the groove width produced a too high radial contrast value. Sample No. 3 that attempted to improve the radial contrast by decreasing the groove depth produced a push-pull signal at a lower level. In contrast, the inventive samples having a groove side wall included angle $\theta$ of more than 120° were excellent in all of these properties.

While there has been described what is at present considered to be the preferred embodiment of the invention, it will be understood that various modifications may be made therein, and it is intended to cover in the appended claims all such modifications as fall within the true spirit and scope of the invention.

We claim:

1. A magneto-optical disk comprising a disk-shaped substrate having a surface including a region where a groove is formed and a recording layer in the form of a magnetic thin film covering the grooved region, wherein the groove is defined by a pair of opposed side walls and a bottom in a radial cross section of the substrate and has a depth from the substrate surface to the groove bottom, the angle $\theta$ included between tangents to the side walls at a height from the groove bottom corresponding to 50% of the groove depth is at least 120 degrees, and the groove has a half-value width of 0.90 to 1.15 $\mu$m and a depth of 600 to 900 Å.

2. The disk of claim 1 wherein the groove having a half-value width is separated from the adjacent groove by a land having a width in a radial direction, the groove half-value width being not smaller than the land width.

3. The disk of claim 1 wherein signals are recorded in and reproduced from the recording layer within the groove by means of an optical head having an objective lens with a numerical aperture NA of 0.40 to 0.50 using linearly polarized laser light of 600 to 900 nm in wavelength having an electric field vector in a radial direction of the substrate.

4. The disk of claim 1 wherein the angle $\theta$ is 120 to 165 degrees.

5. The disk of claim 1 wherein the reflectance through the substrate at the wavelength of recording and reproducing light is 15 to 25% in both recorded and unrecorded portions.

6. The disk of claim 1 further comprising a first protective layer on the side of the recording layer adjacent to said substrate and a second protective layer on the side of the recording layer remote from said substrate.

7. The disk of claim 6 further comprising a reflective layer on the second protective layer.

* * * * *